(12) United States Patent
Kosaka et al.

(10) Patent No.: US 10,061,342 B2
(45) Date of Patent: Aug. 28, 2018

(54) BICYCLE OPERATING DEVICE

(71) Applicant: Shimano Inc., Sakai, Osaka (JP)

(72) Inventors: Kentaro Kosaka, Osaka (JP);
Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 218 days.

(21) Appl. No.: 13/755,504

(22) Filed: Jan. 31, 2013

(65) Prior Publication Data
US 2014/0208888 A1    Jul. 31, 2014

(51) Int. Cl.
| | |
|---|---|
| *G05G 1/04* | (2006.01) |
| *B62K 23/06* | (2006.01) |
| *B62M 25/08* | (2006.01) |
| *B62K 23/04* | (2006.01) |

(52) U.S. Cl.
CPC ............... *G05G 1/04* (2013.01); *B62K 23/04* (2013.01); *B62K 23/06* (2013.01); *B62M 25/08* (2013.01); *Y10T 74/20612* (2015.01)

(58) Field of Classification Search
CPC ......... Y10T 74/20438; Y10T 74/20274; Y10T 74/2028; Y10T 74/20043; Y10T 74/20049; B62K 23/02; B62K 23/06; B62M 25/08; B62M 25/04; B62M 25/02; B62L 3/02
USPC ............. 74/502.2, 488, 489, 473.14, 473.15, 74/577 R, 577 S; 200/61.88
See application file for complete search history.

(56) References Cited

U.S. PATENT DOCUMENTS

| | | | |
|---|---|---|---|
| 5,481,934 A | 1/1996 | Tagawa | |
| 5,816,111 A * | 10/1998 | Borchers | 74/577 S |
| 5,829,313 A * | 11/1998 | Shahana | 74/502.2 |
| 5,894,759 A | 4/1999 | Nakamura | |
| 6,209,413 B1 | 4/2001 | Chang | |
| 6,698,307 B2 | 3/2004 | Wesling et al. | |
| 6,729,203 B2 | 5/2004 | Wesling et al. | |
| 7,665,384 B2 * | 2/2010 | Sato et al. | 74/502.2 |
| 2008/0121066 A1 * | 5/2008 | Takebayashi | B62K 23/06 |
| | | | 74/502.2 |
| 2008/0314191 A1 * | 12/2008 | Miki et al. | 74/502.2 |
| 2009/0038427 A1 * | 2/2009 | Watarai | 74/473.13 |
| 2011/0257841 A1 | 10/2011 | Hara et al. | |

FOREIGN PATENT DOCUMENTS

| | | |
|---|---|---|
| DE | 31 45 314 A1 | 5/1983 |
| DE | 202012002702 U1 | 6/2012 |
| EP | 2 253 531 A1 | 11/2010 |

* cited by examiner

*Primary Examiner* — Daniel D Yabut
(74) *Attorney, Agent, or Firm* — Global IP Counselors, LLP

(57) ABSTRACT

A bicycle operating device is basically provided with a base member, a first operating member, a second operating member and a clicking mechanism. The base member is configured to be attached to a bicycle. The first operating member is movably supported on the base member from a rest position to an operated position. The second operating member is movably supported on the base member from a rest position to an operated position. The clicking mechanism includes a first part contacting at least one of the first operating member and the second operating member to produce a haptic feedback response as each of the first and second operating members moves from the rest position towards the operated position, respectively.

17 Claims, 13 Drawing Sheets

BICYCLE OPERATING DEVICE

BACKGROUND

Field of the Invention

This invention generally relates to a bicycle operating device. More specifically, the present invention relates to a bicycle operating device in which a clicking mechanism is provided to indicate an actuation operation of at least one bicycle component.

Background Information

Bicycles are often provided with one or more bicycle components that can be operated and/or adjusted by a rider while riding. Examples of some these bicycle components include an electric suspension, an electric gear changing device (e.g., an electric derailleur or electric internally geared hub) and an electric seatpost. A bicycle operating device is usually provided on a bicycle (e.g., on a bicycle handlebar) for a rider to electrically operate and/or adjust these bicycle electric components. Sometimes these bicycle operating devices are provided with an indicating device such as a clicking mechanism to indicate to the rider that an operating member has been operated to a predetermined position.

SUMMARY

Generally, the present disclosure is directed to various features of a bicycle operating device that is configured to be attached to a bicycle handlebar. The handlebar often has several bicycle operating devices, such as shift operating devices and brake operating devices, as well as other bicycle components such as cycle computers, headlights, bells, etc. Thus, the bicycle handlebar can become very crowded with bicycle operating devices and/or bicycle components. In view of the state of the known technology, one object is to provide a bicycle operating device with a clicking mechanism that produces a haptic feedback response to a rider to notify of the operation of a pair of operating members of the bicycle operating device.

In accordance with a first aspect of the present invention, a bicycle operating device is proposed that basically comprises a base member, a first operating member, a second operating member and a clicking mechanism. The base member is configured to be attached to a bicycle. The first operating member is movably supported on the base member from a rest position to an operated position. The second operating member is movably supported on the base member from a rest position to an operated position. The clicking mechanism includes a first part contacting at least one of the first operating member and the second operating member to produce a haptic feedback response as each of the first and second operating members moves from the rest position towards the operated position, respectively.

In accordance with a second aspect of the present invention, the bicycle operating device according to the first aspect is configured so that the first operating member moves with respect to the base member while the second operating member remains stationary as the first operating member is operated, and so that the first operating member and the second operating member move together as the second operating member is operated.

In accordance with a third aspect of the present invention, the bicycle operating device according to the second aspect is configured so that the first part contacts the first operating member as each of the first and second operating members moves from the rest position towards the operated position, respectively.

In accordance with a fourth aspect of the present invention, the bicycle operating device according to the first aspect is configured so that the first operating member is a trigger operating lever that is biased to the rest position of the first operating member with respect to the base member.

In accordance with a fifth aspect of the present invention, the bicycle operating device according to the fourth aspect is configured on that the second operating member is a trigger operating lever that is biased to the rest position of the second operating member with respect to the base member.

In accordance with a sixth aspect of the present invention, the bicycle operating device according to the first aspect is configured so that the base member is configured to be attached to a bicycle handlebar having a handlebar axis, so that the first operating member is configured to rotate about the handlebar axis while the base member is attached to the bicycle handlebar, and so that the second operating member is configured to rotate about the handlebar axis while the base member is attached to the bicycle handlebar.

In accordance with a seventh aspect of the present invention, the bicycle operating device according to the sixth aspect is configured so that the first operating member includes a first mounting part rotatably supported on the base member about the handlebar axis and a first lever part projecting outwardly from the first mounting part, and so that the second operating member includes a second mounting part rotatably supported on the base member about the handlebar axis and a second lever part projecting outwardly from the second mounting part.

In accordance with an eighth aspect of the present invention, the bicycle operating device according to the first aspect is configured so that the first part pivots about a first pivot axis as each of the first and second operating members moves from the rest position towards the operated position, respectively. Also the first part pivots about a second pivot axis, which is offset from the first pivot axis, as each of the first and second operating members moves from the operated position towards the rest position, respectively.

In accordance with a ninth aspect of the present invention, the bicycle operating device according to the eighth aspect is configured so that the clicking mechanism further includes a second part pivotally mounted to the base member about the first pivot axis, and the first part is pivotally mounted to the second part about the second pivot axis.

In accordance with a tenth aspect of the present invention, the bicycle operating device according to the ninth aspect is configured so that the first part remains stationary with respect to the second part as the first part and the second part pivot together about the first pivot axis as each of the first and second operating members moves from the rest position towards the operated position, respectively. Also the first part pivots with respect to the second part about the second pivot axis as each of the first and second operating members moves from the operated position towards the rest position, respectively.

In accordance with an eleventh aspect of the present invention, the bicycle operating device according to the first aspect is configured so that the first operating member includes at least one projection that contacts the first part and pivots the first part about the first pivot axis as each of the first and second operating members moves from the rest position towards the operated position, respectively, and contacts the first part and pivots the first part about the second pivot axis as each of the first and second operating members moves from the operated position towards the rest position, respectively.

In accordance with a twelfth aspect of the present invention, the bicycle operating device according to the eighth aspect is configured so that the first operating member includes a first projection and a second projection that contacts the first part as each of the first and second operating members moves from the rest position towards the operated position, respectively. Also the first projection has a first height and the second projection has a second height. The first and second heights of the first and second projections are different from each other.

In accordance with a thirteenth aspect of the present invention, the bicycle operating device according to the twelfth aspect is configured so that the first projection is closer to the first part than the second projection while the first operating member is at the rest position. Also the first height of the first projection is smaller than the second height of the second projection.

In accordance with a fourteenth aspect of the present invention, the bicycle operating device according to the eleventh aspect further comprises an electric control unit that is operated by movement of each of the first and second operating members moving from the rest position towards the operated position, respectively.

Other objects, features, aspects and advantages of the disclosed bicycle operating device will become apparent to those skilled in the art from the following detailed description, which, taken in conjunction with the annexed drawings, discloses one embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
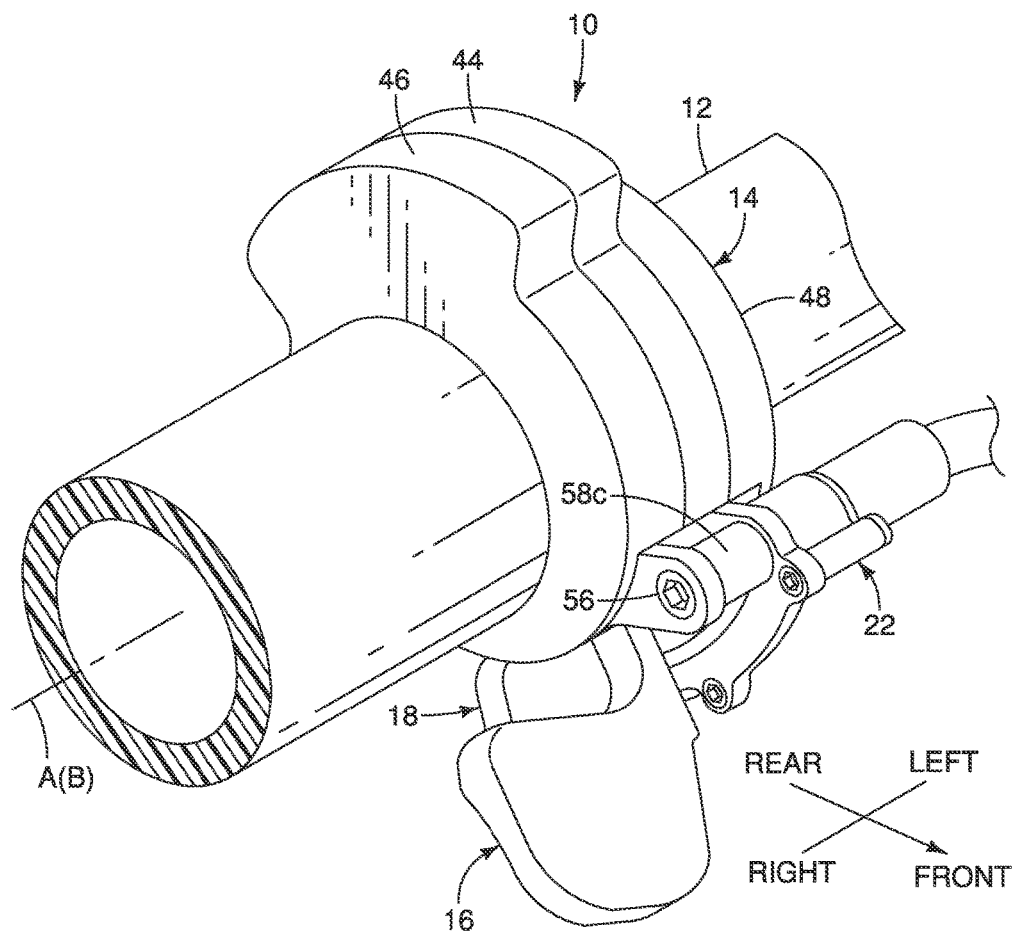
FIG. 1 is a partial perspective view of a right end of a bicycle handlebar that is equipped with a bicycle operating device in accordance with one illustrative embodiment.
Figure 2:
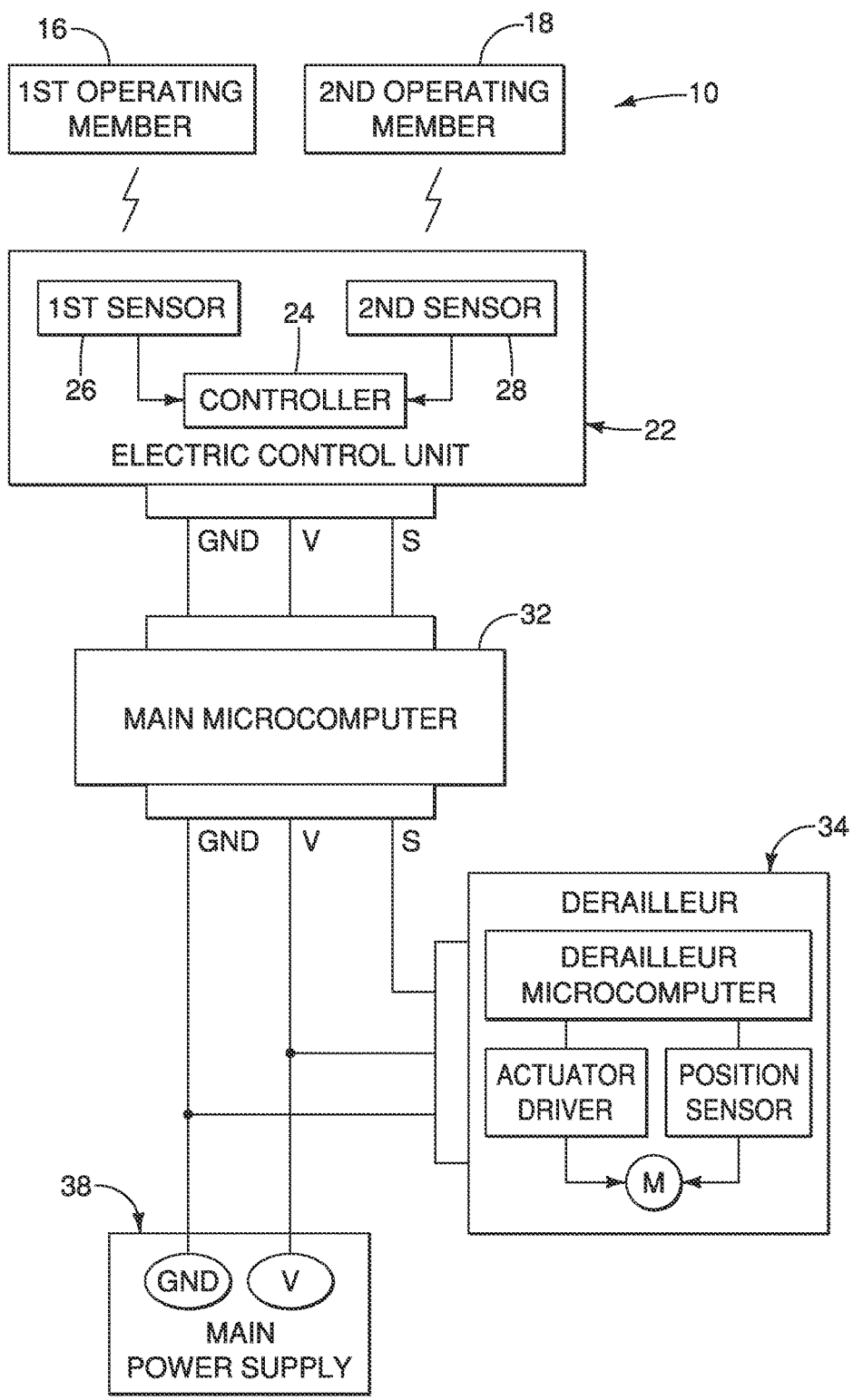
FIG. 2 is a simplified schematic block diagram showing an exemplary configuration of a bicycle control apparatus that includes the bicycle operating device illustrated in FIG. 1.
Figure 3:
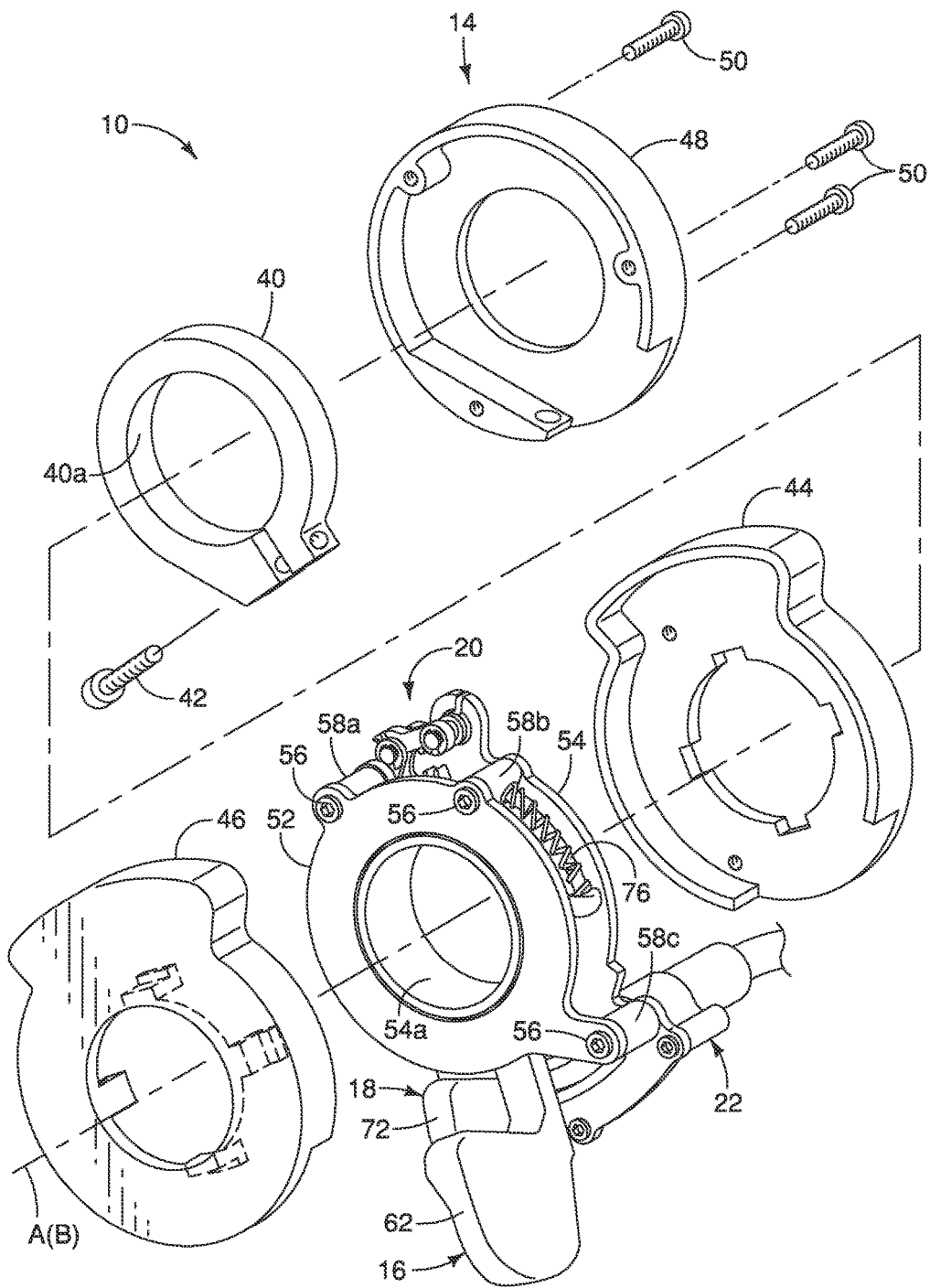
FIG. 3 is an exploded perspective view of the bicycle operating device illustrated in FIG. 1.

Referring initially to FIGS. 1 to 3, a bicycle operating device 10 is illustrated in accordance with one illustrative embodiment. The bicycle operating device 10 is mounted on a bicycle handlebar 12 having a handlebar axis A as seen in FIG. 1. As seen in FIG. 2, the bicycle operating device 10 is a part of a bicycle control apparatus, which for example in the illustrated embodiment changes a gear ratio of a bicycle drive train as discussed. The bicycle operating device 10 basically comprises a base member 14, a first operating member 16 and a second operating member 18 as seen in FIGS. 1 and 3. The first operating member 16 is movably supported on the base member 14 from a rest position to an operated position. The second operating member 18 is also movably supported on the base member 14 from a rest position to an operated position. In the illustrated embodiment, as seen in FIG. 3, the bicycle operating device 10 further comprises a clicking mechanism 20 that notifies a rider of when the first and second operating members 16 and 18 have been moved to operate a bicycle electric component as discussed below.

Also in the illustrated embodiment, the bicycle operating device 10 further comprises an electric control unit 22 that is operated by movement of each of the first and second operating members 16 and 18. Since the bicycle operating device 10 is provided with the electric control unit 22, the bicycle operating device 10 constitutes a bicycle electric operating device for electrically operating at least one of bicycle components. As will become apparent to those skilled in the art from this disclosure, certain aspects of the bicycle operating device 10, which are disclosed herein, can be used in a non-electric bicycle operated operating device that, pulls and releases a cable in response to operation of the first and second operating members 16 and 18.

As seen in FIG. 2, the electric control unit 22 includes a controller 24, a first sensor 26 and a second sensor 28. Preferably, for example, the controller 24 and the first and second sensors 26 and 28 are integrated together on a printed circuit board PC that is mounted to the base member 14. Basically, the first sensor 26 detects operation of the first operating member 16, and outputs signals to the controller 24 based on the movement of the first operating member 16. The second sensor 28 detects operation of the second operating member 18, and outputs signals to the controller 24 based on the movement of the second operating member 18. The electric control unit 22 further includes conventional components such as an input face circuit, an output interface circuit, and storage devices such as a ROM (Read Only Memory) device and a RAM (Random Access Memory) device as needed and/or desired. It will be apparent to those skilled in the art from this disclosure that the precise structure and algorithms for the electric control unit 22 can be any combination of hardware and software that will carry out the functions of the present invention.

In the illustrated embodiment, the first and second sensors 26 and 28 wirelessly or non-physically detect the operation of the first and second operating members 16 and 18. The first and second sensors 26 and 28 can be, for example, resistive position sensors, optical position sensors, Hall Effect sensors, magnetoresistive sensors, etc. However, other types of position sensing arrangements can be utilized as needed and/or desired. For example, the first and second sensors 26 and 28 could be electrically connected to the first and second operating members 16 and 18, respectively, by using contacts and brushes and/or using wires in a conventional manner.

The simplified schematic block diagram of FIG. 2 illustrates one example of the bicycle control apparatus that includes the bicycle operating device 10. The bicycle control apparatus includes a main microcomputer 32 that is mounted on a portion of a bicycle in a conventional manner. The main microcomputer 32 further includes a central processing unit (CPU) and conventional components such as an input interface circuit, an output interface circuit, and storage devices such as a ROM (Read Only Memory) device and a RAM (Random Access Memory) device as needed and/or desired will be apparent to those skilled in the art from this disclosure that the precise structure and algorithms for the main microcomputer 32 can be any combination of hardware and software that will carry out the functions of the present invention. In the illustrated embodiment, the main microcomputer 32 is configured to receive signals and process the signals to at least control an electrically operable derailleur 34. The derailleur 34 can be either a front derailleur or a rear derailleur. Since electrically operable derailleurs are well known in the bicycle field, details of the electrically operable derailleur 34 have been omitted for the sake of brevity.

The main microcomputer 32 is programmed to selectively change shift the derailleur 34 in response to a manual input from a rider operating the first and second operating members 16 and 18 or an automatic input from a control program in the main microcomputer 32. In other words, the main microcomputer 32 is configured to selectively change a gear position of the derailleur 34 either manually or automatically.

The bicycle control apparatus further includes a main power supply 38 (e.g., a battery or capacitor as shown) for supplying electrical power to the electric control unit 22 of the bicycle operating device 10, the main microcomputer 32 and the derailleur 34. However, the main power supply 38 is not limited to a battery as a power source. Rather, for example, a generator by itself or a generator with a battery can be used for the main power supply 38. Also the various components of the bicycle control apparatus can be provided with their own individually battery or capacitor instead of receiving power from the main power supply 38.

Here, in the illustrated embodiment, the electric control unit 22 of the bicycle operating device 10 and the derailleur 34 are electrically connected to the main microcomputer 32 by electrical cables that transmit control signals using signal lines S and the transmit power using conductive lines GND and V. However, the main microcomputer 32 can execute two-way communications using electric power line communications (PLC) if needed and/or desired. Moreover, wireless communications could be used to transmit control signals between the main microcomputer 32 and the electric control unit 22 of the bicycle operating device 10 and/or between the main microcomputer 32 and the derailleur 34 if needed and/or desired.

Depending on the configuration of the bicycle, the main microcomputer 32 can also receive signals from one or more additional bicycle operating devices, and thus, can further be configured to control other bicycle components such as an additional electrically operable derailleur, an additional electrically adjustable suspension and an electrically adjustable seatpost.

As seen in FIG. 3, the base member 14 includes a fixing member 40 that is configured to be fixed to the handlebar 12 of a bicycle. As a result, the first operating member 16 is configured to rotate about the handlebar axis A while the base member 14 is attached to the bicycle handlebar (hereinafter just "handlebar") 12. Likewise, the second operating member 18 is configured to rotate about the handlebar axis A while the base member 14 is attached to the handlebar 12. In the illustrated embodiment, the fixing member 40 is a conventional tube clamp that squeezes the handlebar 12 by tightening a fixing bolt 42.

As seen in FIG. 3, the fixing member 40 of the base member 14 includes a handlebar receiving opening 42 defining a handlebar mounting axis B. The handlebar mounting axis B coincides with the handlebar axis A of the handlebar 12 when mounted to the handlebar 12. Thus, the base member 14 is configured to be attached to the handlebar 12 by the fixing member 40. In the illustrated embodiment, the base member 14 further includes a first cover member 44, a second cover member 46 and a third cover member 48. The first and second cover members 44 and 46 are snap-fitted together to form a housing that partially encloses the first and second operating members 16 and 18. The third cover member 48 is fixedly connected to the fixing member 40 by passing the fixing bolt 42 through an opening of the cover member 48. The third cover member 48 attaches the fixing member 40 to the first and second cover members 44 and 46. In this way, the first and second cover members 44 and 46 are non-rotatably fixed to the handlebar 12 by the fixing member 40. The first, second and third cover members 44, 46 and 48 are made of a suitable material such as a hard rigid plastic.

Still referring to FIG. 3, in the illustrated embodiment, the base member 14 further includes a first support member 52 and a second support member 54. The first and second support members 52 and 54 are fixed together by a plurality (three) of threaded fasteners 56. The first and second support members 52 and 54 are spaced apart by a plurality (three) of spacers 58a, 58b and 58c. The first and second operating members 16 and 18 are compactly arranged between the first and second support members 52 and 54 as an integrated unit.

Figure 4:
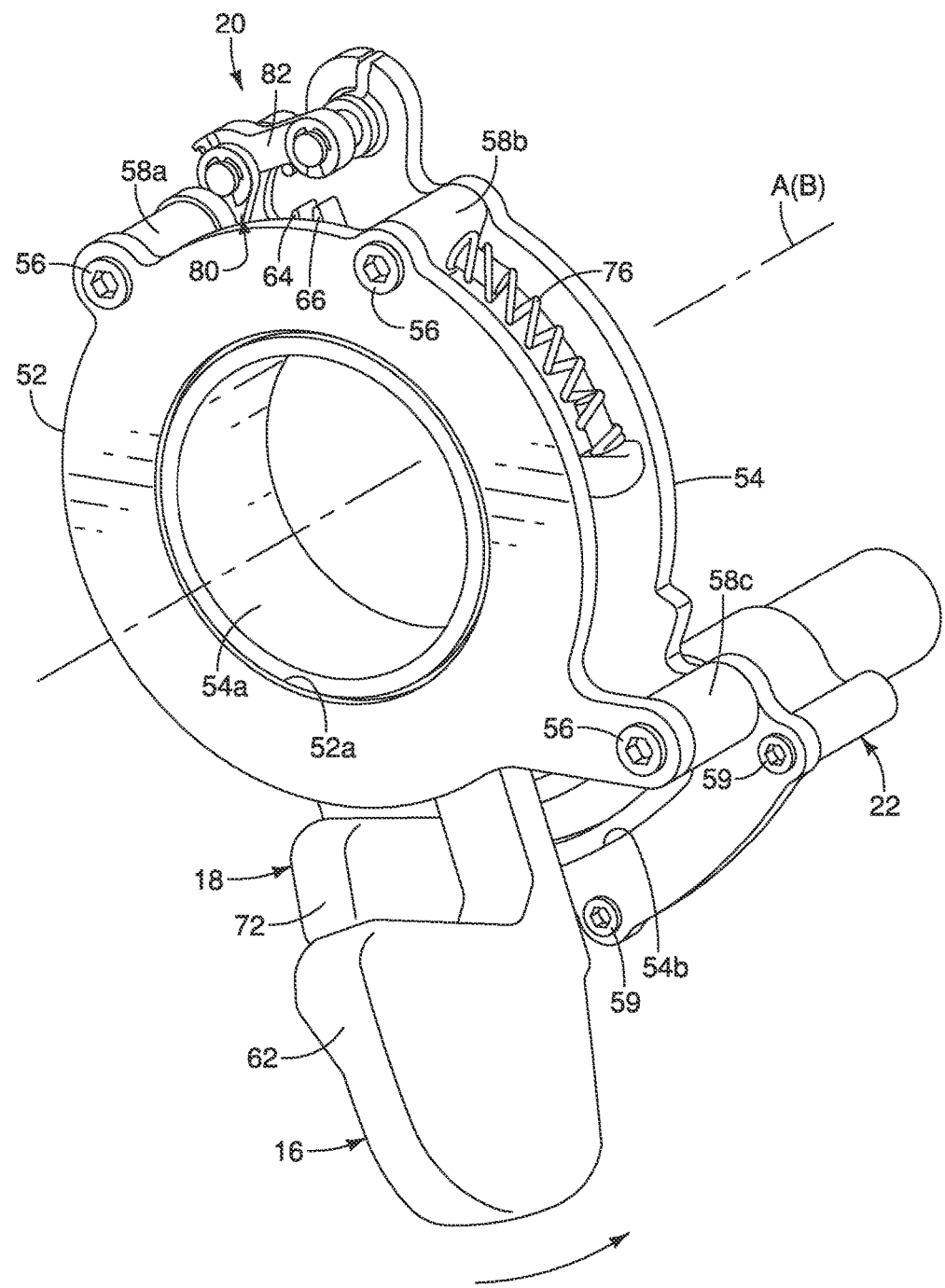
FIG. 4 is an enlarged perspective view of selected parts of the bicycle operating device illustrated in FIGS. 1 and 3 with the housing and the handlebar clamp removed.
Figure 5:
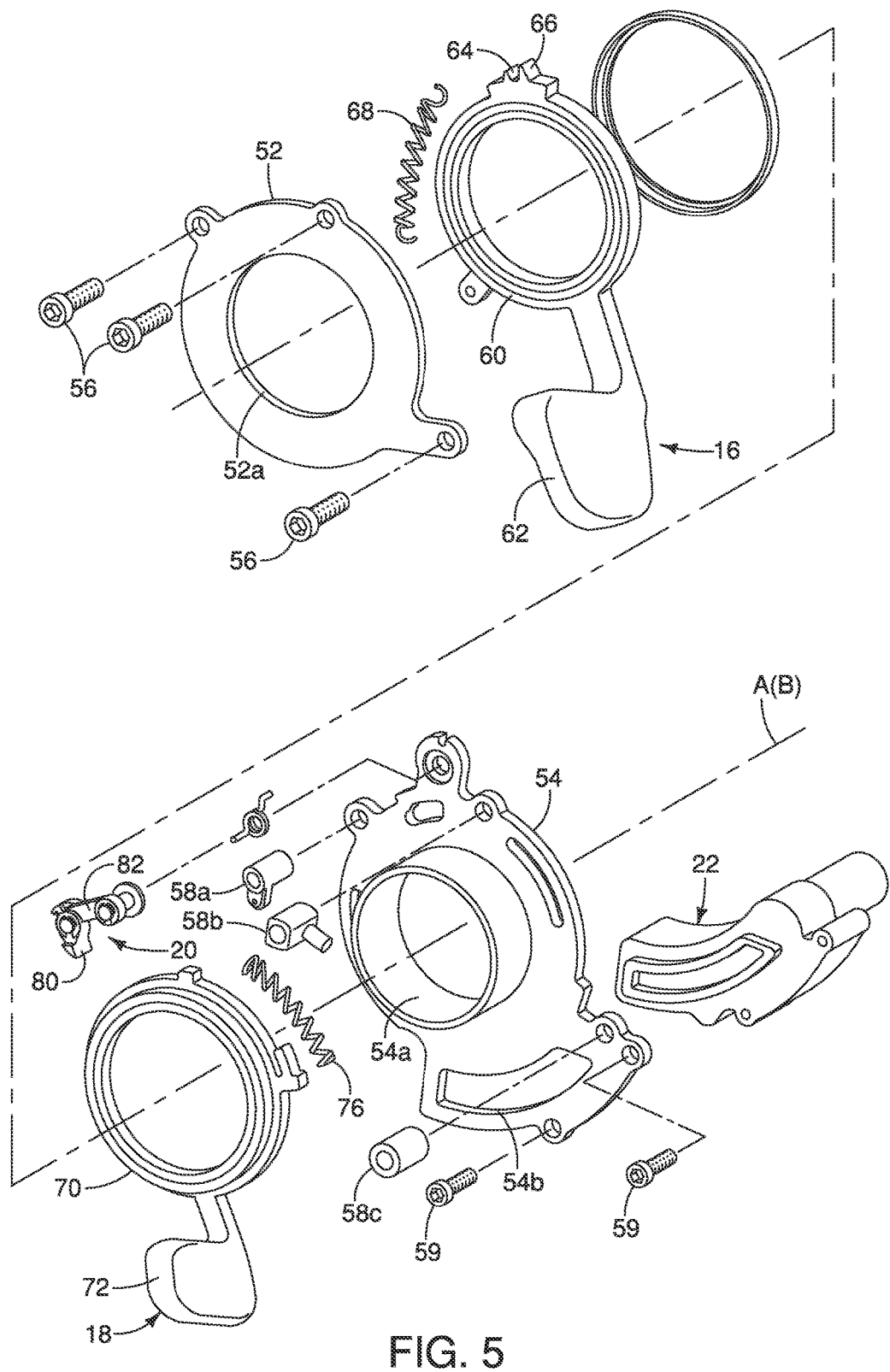
FIG. 5 is a further exploded perspective view of the selected parts of the bicycle operating device illustrated in FIG. 4.
Figure 6:
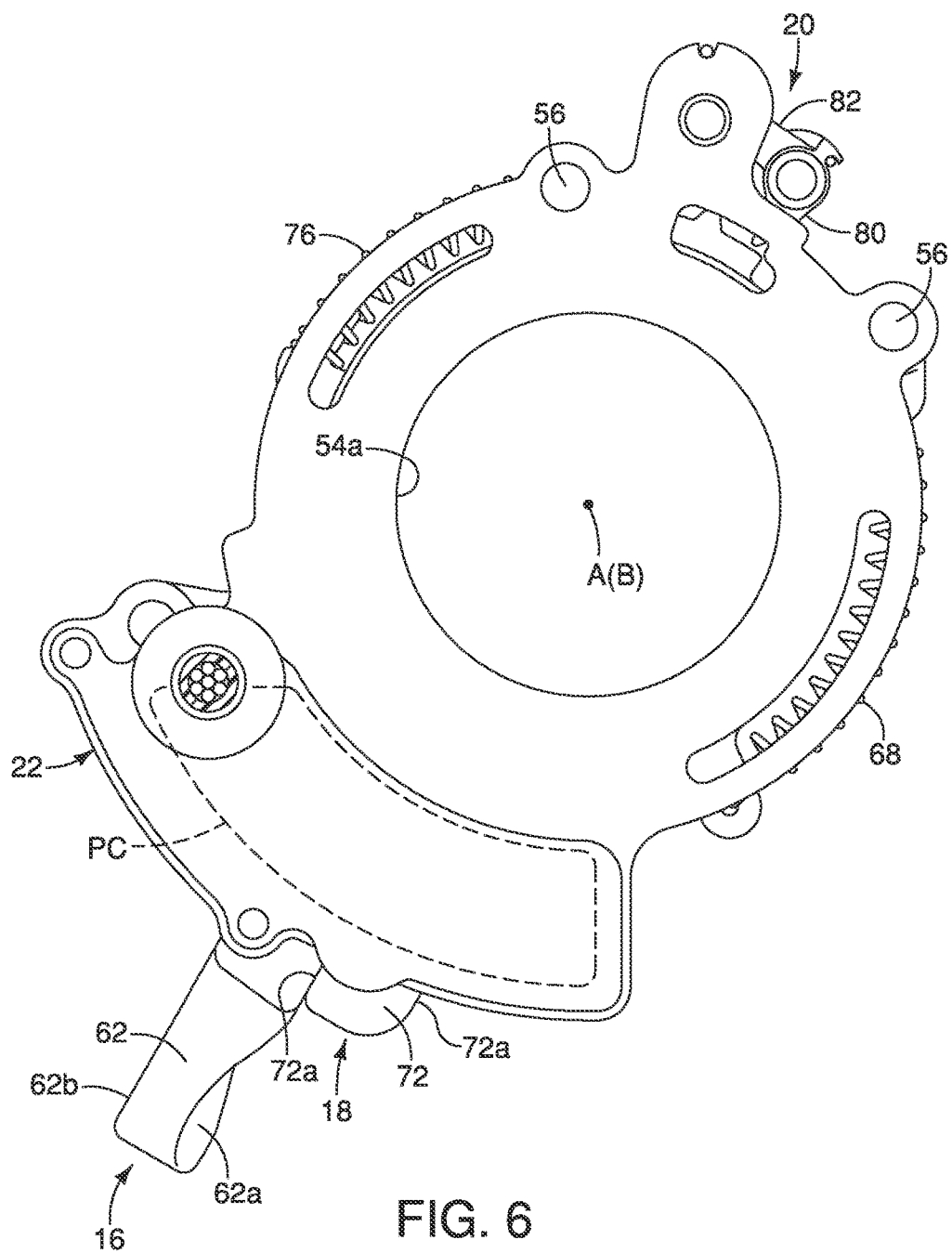
FIG. 6 is an elevational view of the selected parts of the bicycle operating device illustrated in FIGS. 4 and 5 looking from the center of the handlebar toward the right end of the handlebar.

As seen in FIGS. 4 to 6, the second support member 54 preferably has a tubular portion 54a that forms a handlebar receiving part of the base member 14. The tubular portion 54a extends into an opening 52a of the first support member 52 as seen in FIG. 4. Although not shown, preferably, two bearings provided on the tubular portion 54a for rotatably supporting the first and second operating members 16 and 18 on the tubular portion 54a. In other words, a first bearing is disposed between the first operating member 16 and the outer surface of the tubular portion 54a, and a second bearing is disposed between the second operating member 18 and the outer surface of the tubular portion 54a. As seen in FIGS. 5 and 6, the electric control unit 22 is attached to the second support member 54 by a pair of screws 59. The second support member 54 (preferably has an opening 54b for receiving portion of the electric control unit 22 to further support the electric control unit 22 on the second support member 54.

Referring to FIGS. 5 to 12, the first and second operating members 16 and 18 will be now described in more detail. In the illustrated embodiment, as best seen FIG. 5, the first operating member 16 includes a first mounting part 60 and a first lever part 62 (i.e., a first user operating lever). The first mounting part 60 of the first operating member 16 includes a first projection 64 and a second projection 66 for cooperating with the clicking mechanism 20 as discussed below. As best seen FIGS. 8 to 12, the first operating member 16 is biased toward a first rest position by a biasing element 68 on as to return to the first rest position after being operated to an operated position. Similarly, in the illustrated embodiment, the second operating member 18 includes a second mounting part 70 and a second lever part 72 (i.e., a second user operating lever). The second operating member 18 is biased toward a second rest position by a biasing element 76 so as to return to the second rest position after being operated to an operated position.

Figure 12:
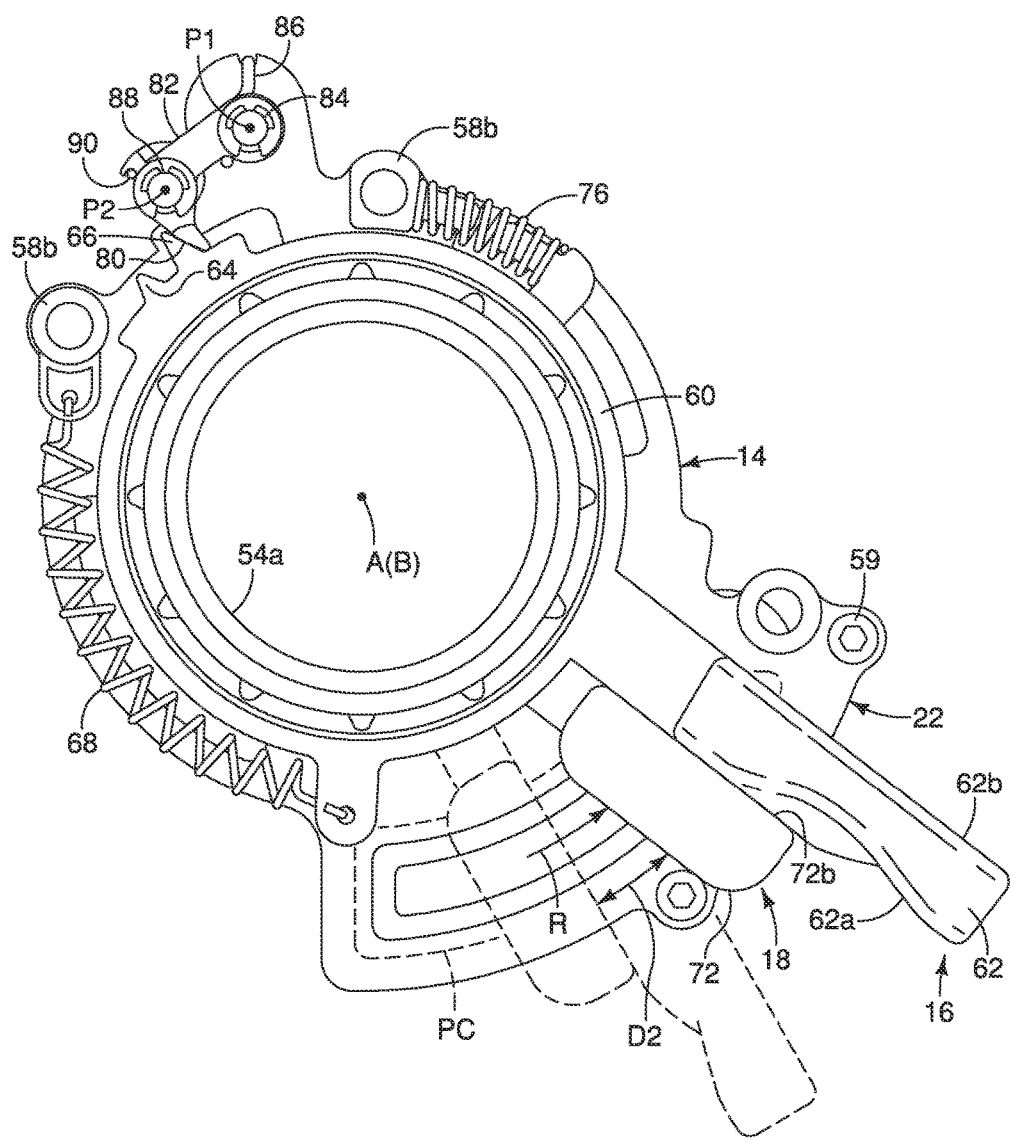
FIG. 12 is an devotional view of selected parts of the bicycle operating device with the first and second operating members moved to an operated position that is further from the rest position than in FIG. 11.

As explained below, the first operating member 16 has two operated positions that each causes the electric control unit 22 to generate control signals. Likewise, as explained below, the second operating member 18 has two operated positions that each causes the electric control unit 22 to generate control signals. For example, the electric control unit 22 generates a first signal as the first operating member 16 reaches a first operated position (FIG. 10) and generates a second signal as the second operating member 18 reaches a second operated position (FIG. 12). The electric control unit 22 generates a third signal as the first operating member 16 reaches a first intermediate position (FIG. 9) and generates a fourth signal as the second operating member 18 reaches a second intermediate position (FIG. 12).

In particular, the electric control unit 22 generates the first signal when the first operating member 16 rotates from the first rest position (FIG. 8) to the first operated position (FIG. 10), which corresponds to a fully operated position. The electric control unit 22 also generates the third signal when the first operating member 16 rotates from the first rest position (FIG. 8) to the first intermediate position (FIG. 9), which corresponds to a partially operated position between the first rest position (FIG. 8) and the first operated position (FIG. 10). More specifically, the first operating member 16 is rotated from the first rest position (FIG. 8) by a first prescribed distance D1 to reach the first intermediate position (FIG. 9), and rotated from the first rest position (FIG. 8) by a second prescribed distance D2 to reach the first operating position (FIG. 10).

In particular, the electric control unit 22 generates the second signal when the second operating member 18 rotates from the second rest position (FIG. 8) to the second operated position (FIG. 12), which corresponds to a fully operated position. The electric control unit 22 also generates the fourth signal when the second operating member 18 rotates from the second rest position (FIG. 8) to the second intermediate position (FIG. 11), which corresponds to a partially operated position between the second rest position (FIG. 8) and the second operated position (FIG. 12).

In the illustrated embodiment, since both the first and second operating members 16 and 18 use the clicking mechanism 20 to notify the rider when the first and second operating members 16 and 18 have reached the operated position that cause the electric control unit 22 to generate control signals, the first and second operating members 16 and 18 are moved the same amounts to reach the operated positions. More specifically, the second operating member 18 is rotated from the second rest position (FIG. 8) by the first prescribed distance D1 to reach the second intermediate position (FIG. 11), and rotated from the second rest position (FIG. 8) by the second prescribed distance D2 to reach the second operating position (FIG. 12).

As seen in FIGS. 8 to 12, the first operating member 16 and the second operating member 18 are rotatably supported on the tubular portion 54a of the base member 14 to rotate about the handlebar mounting axis B. As a result, the first operating member 16 is configured to rotate about the handlebar axis A and the handlebar mounting axis B between the first rest position and a first operated position while the base member 14 is attached to the handlebar 12. Similarly, the second operating member 18 is configured to rotate about the handlebar axis A between a second rest position and a second operated position while the base member 14 is attached to the handlebar 12.

Figure 8:
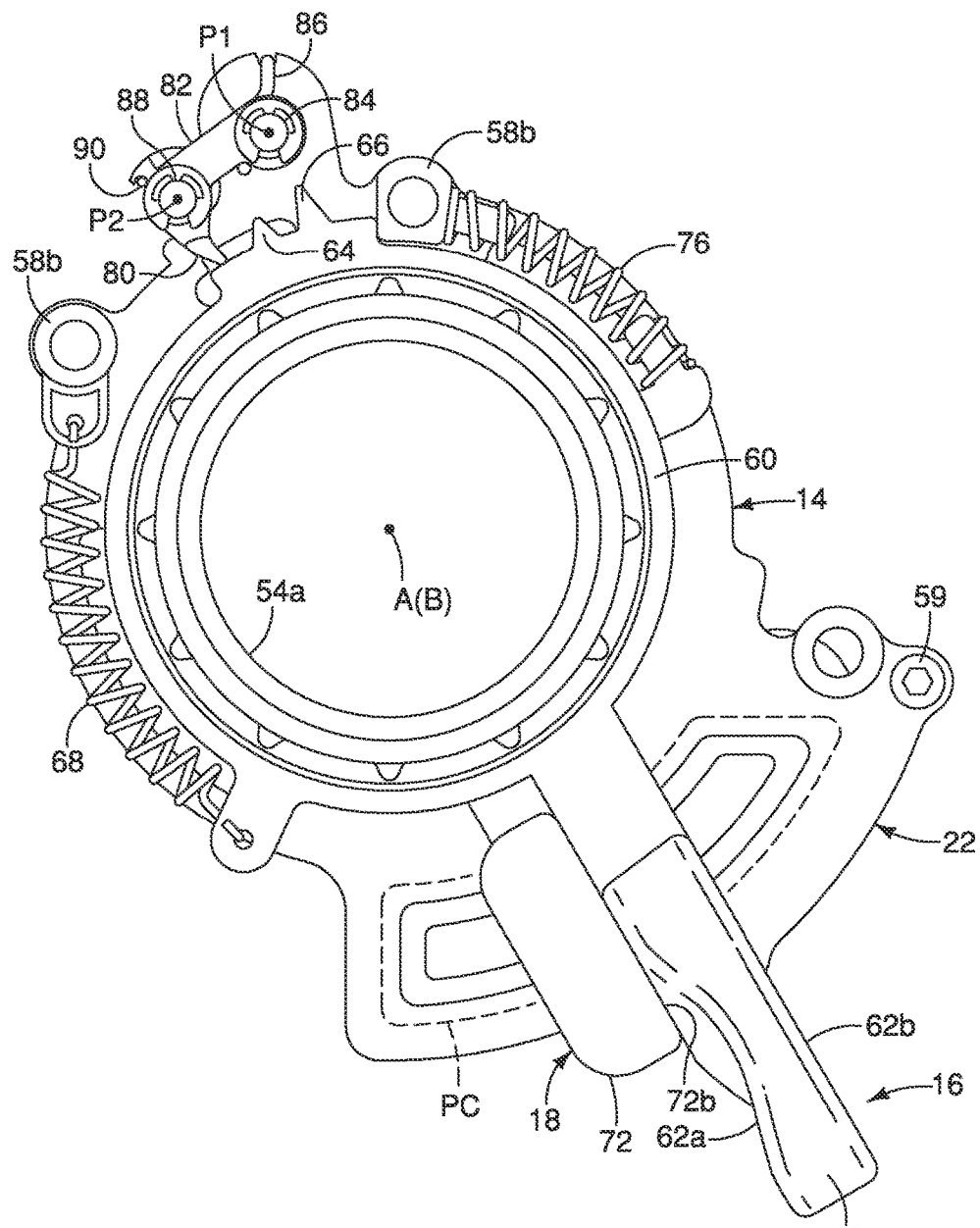
FIG. 8 is an elevational view of selected parts of the bicycle operating device with the first and second operating members in their rest positions.
Figure 9:
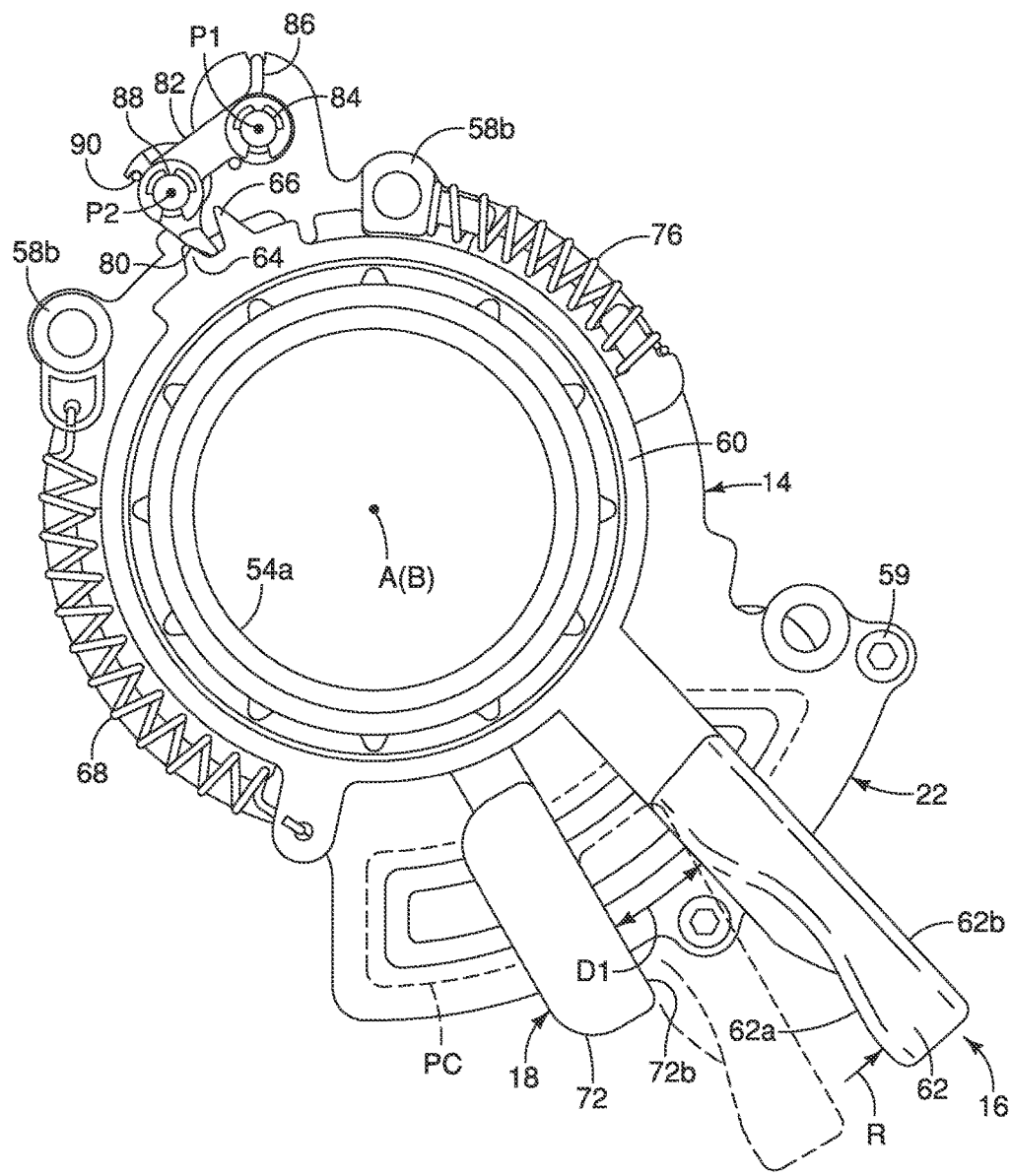
FIG. 9 is an elevational view of selected parts of the bicycle operating device with the first operating member moved to an operated position and the second operating member in the rest position.
Figure 10:
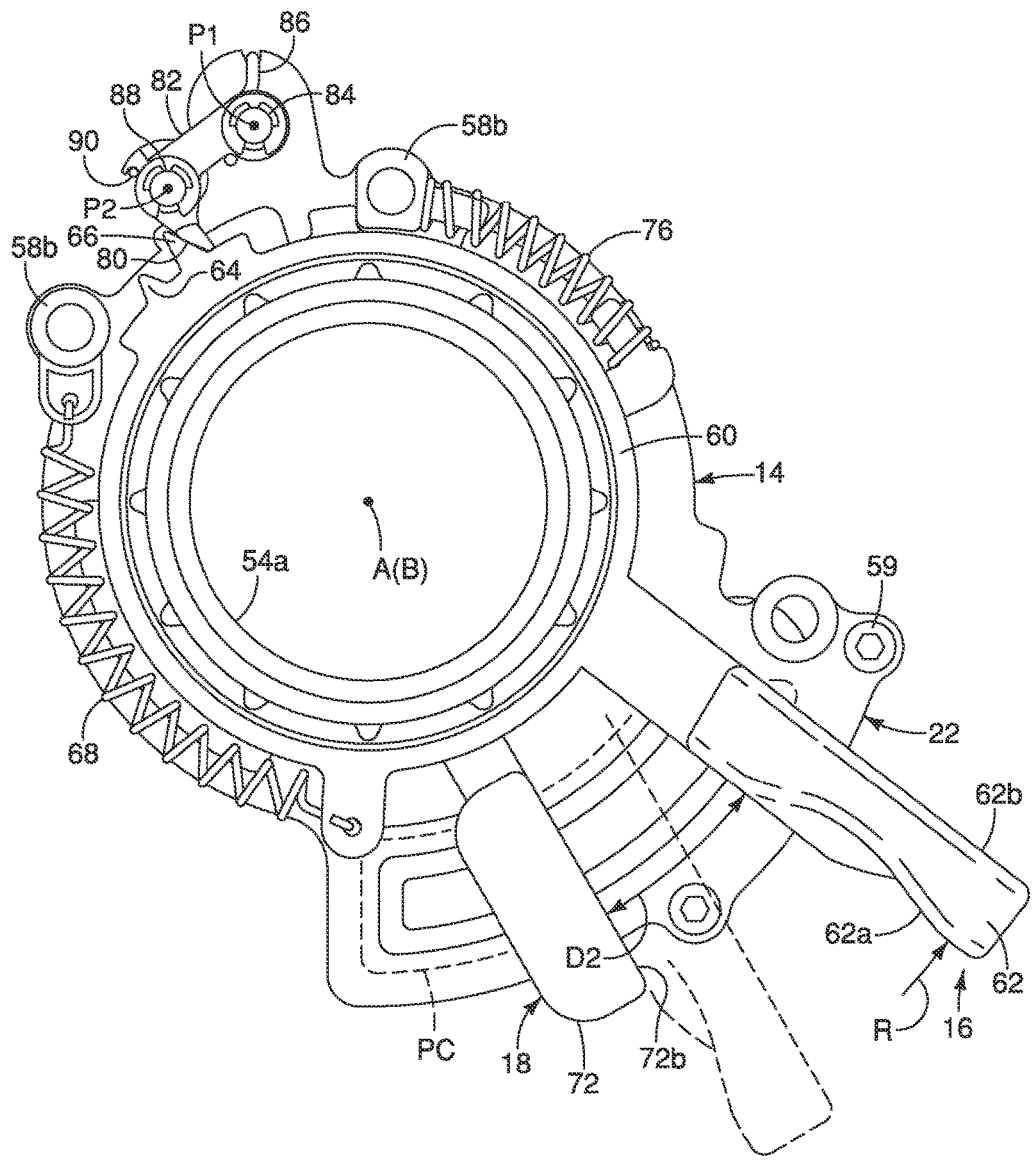
FIG. 10 is an devotional view of selected parts of the bicycle operating device with the first operating member moved to an operated position that is further from the rest position than in FIG. 9, and the second operating member in the rest position.
Figure 11:
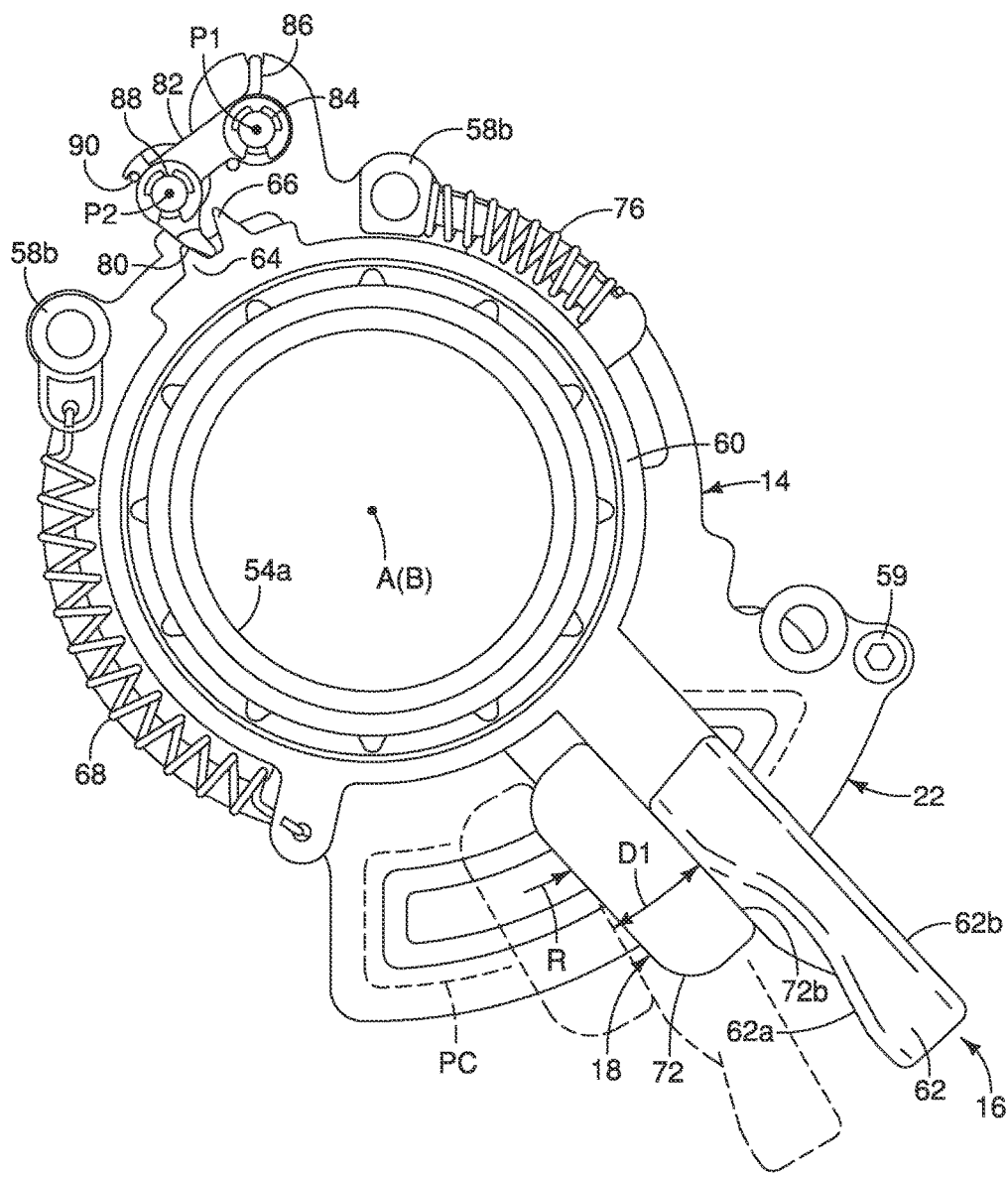
FIG. 11 is an elevational view of selected parts of the bicycle operating device with the first and second operating members moved to an operated position.

Referring to FIGS. 8 to 12, in the illustrated embodiment, the first operating member 16 and the second operating member 18 are operated from the first rest position (FIG. 8) and the second rest position (FIG. 8), respectively, in an operating direction i.e., a first rotational direction R) that is the same with respect to the handlebar axis A. As seen in FIGS. 9 and 10, the first operating member 16 moves (i.e., rotates) with respect to the base member 14 about the handlebar axis A, while the second operating member 18 remains stationary as the first operating member 16 is operated. On the other hand, as seen in FIGS. 11 and 12, the first operating member 16 and the second operating member 18 move together with respect to the base member 14 about the handlebar axis A as the second operating member 18 is operated.

In the illustrated embodiment, the electric control unit 22 generates the first signal as the first operating member 16 reaches the first operated position (FIG. 10). The electric control unit 22 generates the second signal as the second operating member 18 reaches the second operated position (FIG. 12). Also the electric control unit 22 generates a third signal as the first operating member 16 reaches a first intermediate position (FIG. 9) between the first rest position (FIG. 8) and the first operated position (FIG. 10). Finally, the electric control unit 22 generates a fourth signal as the second operating member 18 reaches a second intermediate position (FIG. 11) between the second rest position (FIG. 8) and the second operated position (FIG. 12). In this embodiment the first and second signals are simultaneously generated and the third and fourth signals are simultaneously generated when the second operating member 18 is operated because the first operating member 16 rotates together with the second operating member 18 during operation of the second operating member 18. Specifically, in the illustrated embodiment, the electric control unit 22 generates shift signals as the first to fourth signals in accordance with movements of the first and second operating members 16 and 18 moving from their rest positions towards their operated positions. For example, the first and third signals are used as one of an upshift signal and a downshift signal and the second and fourth signals are used as the other of the upshift signal and the downshift signal. As described above, the first and second control signals are simultaneously generated as the second operating member 18 is operated. The main microcomputer 32 is programed so that the main microcomputer 32 ignores the first signal in such situation.

In one embodiment, the electric control unit 22 generates one of an upshift signal and a downshift signal as the first operating member 16 is operated in the first rotational direction R by the first movement amount D1, and generates the other of the upshift signal and the downshift signal as the first operating member 16 is operated in the first rotational direction R by the second movement amount D2. In this way, the first operating member 16 can operate the derailleur 34 for both upshifting and down shifting. In the illustrated embodiment, the first movement amount D1 is smaller than the second movement amount D2. Thus, the second movement amount D2 is different from the first movement amount D1 in the illustrated embodiment.

Alternatively, in another embodiment, the electric control unit 22 and/or the main microcomputer 32 can be selectively programmed so that the first operating member 16 can operate two separate electric shifting devices (e.g., front and rear derailleurs). For example, the electric control unit 22 generates one of an upshift signal and a downshift signals the first operating member 16 is moved by the first movement amount D1 to operate a first electric shifting device, and generates the other of the upshift signal and the downshift signal as the first operating member 16 is moved by the second movement amount D2 to operate a second electric shifting device. Likewise, the electric control unit 22 also generates one of an upshift and a downshift signal as the second operating member 18 is operated in the first rotational direction R by the first movement amount D1. When the second operating member 18 is operated in the first rotational direction R by the second movement amount D2, the electric control unit 22 and/or the main microcomputer 32 can be selectively programmed so that the electric control unit 22 generates either the other of the upshift and downshift signals or a second one of the upshift and downshift signals. Moreover, the electric control unit 22 and/or the main microcomputer 32 can be selectively programmed so that the electric control unit 22 generates one of an upshift signal and a downshift signal as the first operating member 16 is operated and generates the other of the upshift signal and the downshift signal as the second operating member 18 is operated. In this way, each of the first and second operating members 16 and 18 can perform a single shift operation by being operated by the first movement amount D1 and a doable shift operation by being operated by the second movement amount D2.

In the illustrated embodiment, the first mounting part 60 is rotatably supported on the base member 14 about the handlebar axis A. The first lever part 62 projects outwardly from the first mounting part 60. Preferably, the first operating member 16 is a trigger operating lever that is biased by the biasing element 68 to the rest position of the first operating member 16 with respect to the base member 14. Here, the biasing element 68 is a coil tension spring that has a first end 68a attached to the first operating member 16 and a second end 68b that is attached to the spacer 58a. Thus, when the first operating member 16 is moved from the rest position (FIG. 8) to an operated position (FIG. 9 or 10), the biasing element 68 is stretched so as to apply a biasing force on the first operating member 16. Preferably, the biasing element 68 is loaded (i.e., slightly stretched) while the first operating member 16 is in the rest position (FIG. 8).

In the illustrated embodiment, the second mounting part 70 is rotatably supported on the base member 14 about the handlebar axis A. The second lever part 72 projects outwardly from the second mounting part 70. Preferably, the second operating member 18 is a trigger operating lever that is biased by the biasing element 76 to the rest position of the second operating member 18 with respect to the base member 14. Here, the biasing element 76 is a coil compression spring that has a first end 76a abutting against the second operating member 18 and a second end 76b abutting against the spacer 58b. Thus, when the second operating member 18 is moved from the rest position (FIG. 8) to an operated position (FIG. 11 or 12), the biasing element 76 is compressed so as to apply a biasing force on the second operating member 18. Preferably, the biasing element 76 is loaded (i.e., slightly compressed) while the second operating member 18 is in the rest position (FIG. 8).

In the illustrated embodiment, the first lever part 62 and the second lever part 72 are offset relative to each other in a rotational direction of the first mounting part 60 and the second mounting part 70. Also the first lever part 62 and the second lever part 72 are at least partially offset relative to each other in a radial direction of the first mounting part 60 and the second mounting part 70 in the illustrated embodiment. The first lever part 62 and the second lever part 72 have different shapes and different sizes. The first lever part 62 of the first operating member 16 includes a user operating surface 62a and a non-user operating surface 62b. The user operating surface 62a is operated by a user as the first operating member 16 is operated. The non-user operating surface 62b is untouchably arranged as the first operating member 16 is operated. Likewise, the second lever part 72 of the second operating member 18 includes a user operating surface 72a and a non-user operating surface 72b. The user operating surface 72a is operated by a user as the second operating member 18 is operated. The non-user operating surface 72b is untouchably arranged as the second operating member 18 is operated.

Figure 7:
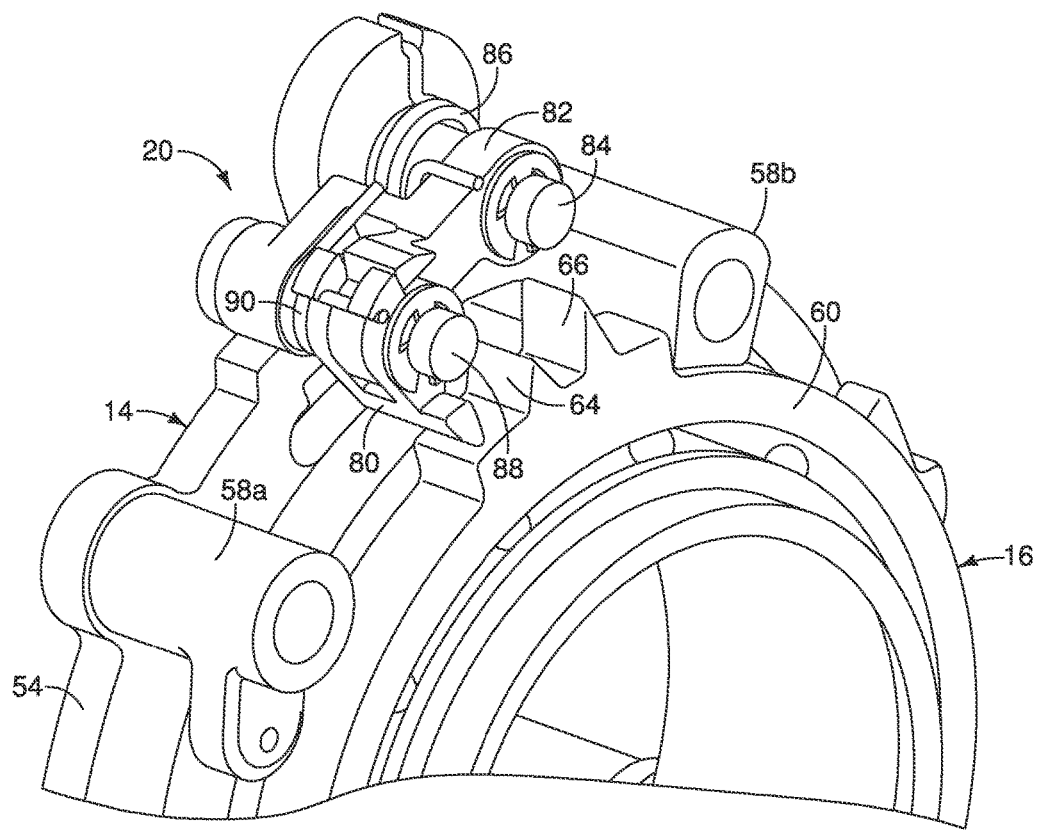
FIG. 7 is a partial perspective view of a portion of the bicycle operating device that includes a clicking mechanism.
Figure 13:
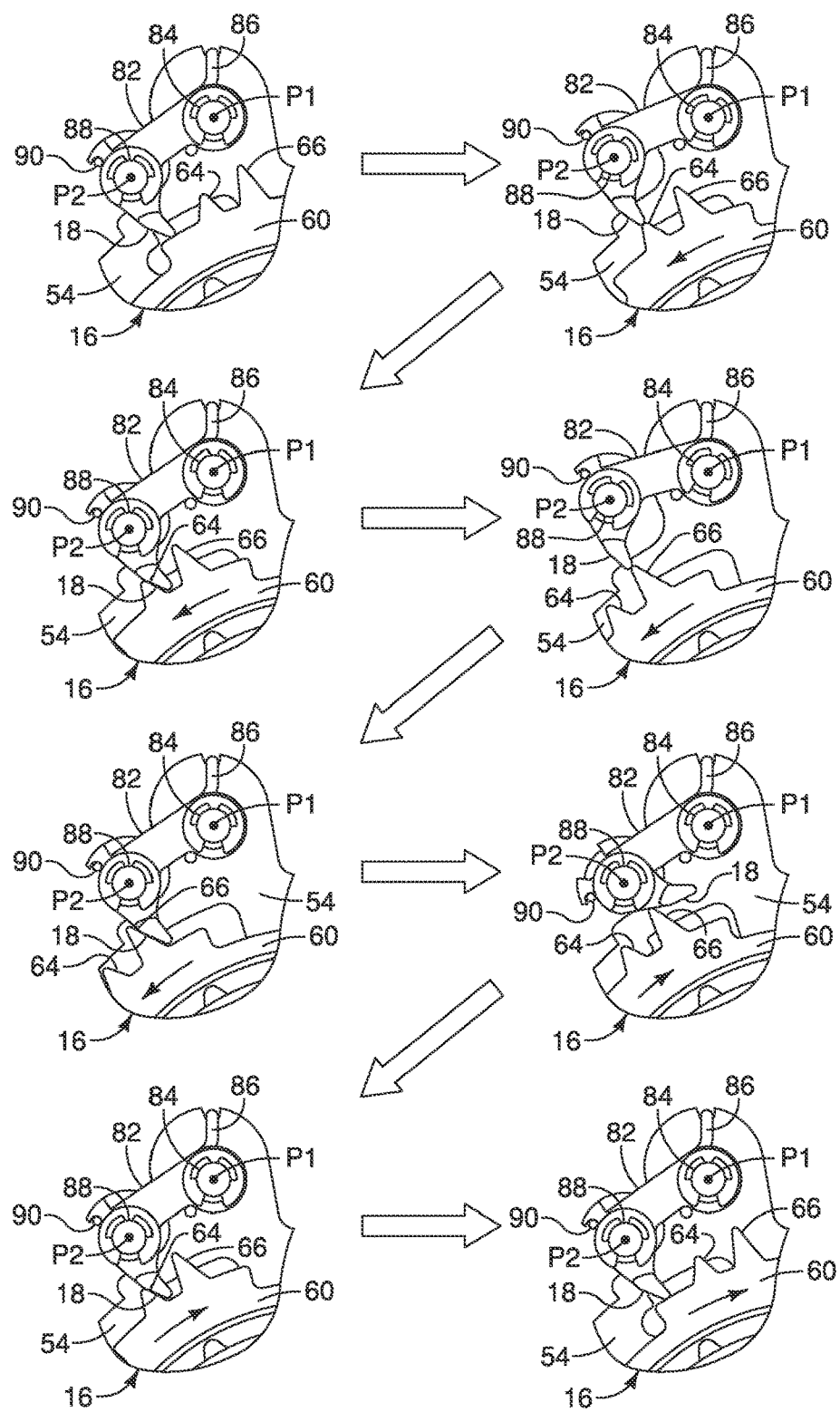
FIG. 13 is a series of partial elevational views of the clicking mechanism of the bicycle operating device being operated.

Referring to FIGS. 7, 8 and 13, the clicking mechanism 20 will be now described in more detail. In the illustrated embodiment, as best seen FIGS. 7 and 8, the clicking mechanism 20 includes a first part 80 contacting at least one of the first operating member 16 and the second operating member 18 to produce a haptic feedback response as each of the first and second operating members 16 and 18 moves from the rest position towards the operated position, respectively. In the illustrated embodiment, the first part 80 is only contacted by the first and second projections 64 and 66 of the first operating member 16 because operation of the second operating member 18 moves the first operating member 16 into contact with the first part 80. If the second operating member 18 were configured to operate independently of the first operating member 16, then the second operating member would be provided with projections similar to the first and second projections 64 and 66 for contacting the first part 80. Thus, the clicking mechanism 20 of the illustrated embodiment could be used with a bicycle operating device having independently operable operating members such that the operating members all use the same clicking mechanism.

In the illustrated embodiment, the clicking mechanism 20 further includes a second part 82 pivotally mounted to the second support member 54 of the base member 14 about a first pivot axis P1. The first part 80 is pivotally mounted to the second part 82 about a second pivot axis P2. Specifically, a first pivot pin 84 is fixedly attached to the second support member 54. The first pivot pin 84 defines the first pivot axis P1. The second part 82 is pivotally mounted on the first pivot pin 84. A first biasing element 86 is operatively disposed between the second part 82 wand the second support member 54. A second pivot pin 88 pivotally attached the first pivot part 80 to the second part 82. The second pivot pin 88 defines a second pivot axis P2. A second biasing element 90 is operatively disposed between the first part 80 and the second part 82.

The second biasing element 90 applies a biasing force on the first part 80 to normally maintain the first part 80 in a predetermined orientation with respect to the second part 82 such that abutments of the first part 80 and the second part 82 abut each other. As a result, the first part 80 only moves relative to the second part 82 as the first and second projections 64 and 66 contact the first part 80 when the first operating member 16 moves from one of the operated positions towards the rest position. In the illustrated embodiment, the second biasing element 90 is a torsion spring having a coiled portion disposed on the second pivot pin 88 one end of the second biasing element 90 contacts the first part 80, while the other end of the second biasing element 90 contacts the second part 82.

The first biasing element 86 applies a biasing force on the second part 82 to bias the second part 82 such that the first part 80 normally contacts the first operating member 16. In other words, the first biasing element 86 biases the first part 80 into engagement with the first operating member 16 while the first operating member 16 is in the first rest position. As a result of this arrangement of the first and second parts 80 and 82, the first and second parts 80 and 82 move together as a unit as the first and second projections 64 and 66 contact the first part 80 when the first operating member 16 moves from the rest position towards one of the operated positions. In the illustrated embodiment, the first biasing element 86 is a torsion spring having a coiled portion disposed on the first pivot pin 84. One end of the first biasing element 86 contacts the second part 82, while the other end of the first biasing element 86 contacts the second support member 54.

Accordingly during operation of the first and second operating members 16 and 18, the first part 80 rotates about the first pivot axis P1 as each of the first and second operating members 16 and 18 moves from the rest position toward one of the operated positions, respectively. Specifically, the first part 80 contacts one or both of the first and second projections 64 and 66 of the first operating member 16 as each of the first and second operating members 16 and 18 moves from the rest position towards the operated position, respectively. The first part 80 remains stationary with respect to the second part 82 as the first part 80 and the second part 82 pivot together about the first pivot axis P1 as each of the first and second operating members 16 and 18 moves from the rest position towards the operated position, respectively.

On the other hand, during release of the first and second operating members 16 and 18, the first part 80 pivots about the second pivot axis P2, which is offset from the first pivot axis P1, as each of the first and second operating members 16 and 18 moves from one of the operated positions toward the rest position, respectively. As a result, the first part 80 moves with respect to the second part 82 about the second pivot axis P2 as each of the first and second operating members 16 and 18 moves from one of the operated positions towards the rest position, respectively.

As mentioned above, the first operating member 16 includes the first projection 64 and the second projection 66. However, alternatively, the first operating member 16 need only include at least one projection, or the first operating member 16 can include more than two projections. In any case, the number of projections will indicate the number of operated positions that can be attained with the shift operating device. The first and second projections 64 and 66 contact the first part 80 and rotates the first part 80 about the first pivot axis P1 as each of the first and second operating members 16 and 18 moves from the rest position towards the operated position, respectively. The first and second projections 64 and 66 also contact the first part 80 and pivots the first part 80 about the second pivot axis P2 as each of the first and second operating members 16 and 18 moves from the operated position towards the rest position, respectively. The first projection 64 has a first height and the second projection 66 has a second height. The first and second heights of the first and second projections 64 and 66 are different from each other. The first projection 64 is closer to the first part 80 than the second projection 66 while the first operating member 16 is at the rest position. The first height of the first projection 64 is smaller than the second height of the second projection 66. By having different heights for the first and second projections 64 and 66, the rider can better distinguish between the two operated positions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only a selected embodiment have been chosen to illustrate the present invention, it will be apparent to those skilled in the art from this disclosure that various changes and modifications can be made herein without departing from the scope of the invention as defined in the appended claims. For example, this invention can be applied for not only a rotary type of a bicycle electric operating device such as described in the illustrated embodiment but can also be applied to any kind of bicycle electric operating device. Moreover, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A bicycle operating device comprising:
a base member configured to be attached to a bicycle;
a first operating member movably supported on the base member from a first rest position to a first operated position;
a second operating member movably supported on the base member from a second rest position to a second operated position; and
a clicking mechanism including a same first part directly contacting either a same projection of the first operating member or respective same projections of the first operating member and the second operating member to produce a haptic feedback response each time the first operating member separately moves from the first rest position towards the first operated position and each time the second operating member moves from the second rest position towards the second operated position.

2. The bicycle operating device according to claim 1, wherein
the first operating member moves with respect to the base member while the second operating member remains stationary as the first operating member is operated; and
the first operating member and the second operating member move together as the second operating member is operated.

3. The bicycle operating device according to claim 2, wherein
the first part contacts the first operating member as each of the first and second operating members moves from the first and second rest positions towards the first and second operated positions, respectively.

4. The bicycle operating device according to claim 1, wherein
the first operating member is a trigger operating lever that is biased to the first rest position of the first operating member with respect to the base member.

5. The bicycle operating device according to claim 4, wherein
the second operating member is a trigger operating lever that is biased to the second rest position of the second operating member with respect to the base member.

6. The bicycle operating device according to claim 1, wherein
the base member is configured to be attached to a bicycle handlebar having a handlebar axis;
the first operating member is configured to rotate about the handlebar axis while the base member is attached to the bicycle handlebar; and
the second operating member is configured to rotate about the handlebar axis while the base member is attached to the bicycle handlebar.

7. The bicycle operating device according to claim 6, wherein
the first operating member includes a first mounting part rotatably supported on the base member about the handlebar axis and a first lever part projecting outwardly from the first mounting part, and
the second operating member includes a second mounting part rotatably supported on the base member about the handlebar axis and a second lever part projecting outwardly from the second mounting part.

8. A bicycle operating device comprising:
a base member configured to be attached to a bicycle;
a first operating member movably supported on the base member from a first rest position to a first operated position;
a second operating member movably supported on the base member from a second rest position to a second operated position, the first operating member being independently movable from the first rest position to the first operated position with respect to the second operating member; and
a clicking mechanism including a first part contacting at least one of the first operating member and the second operating member to produce a haptic feedback response as each of the first and second operating members moves from the first and second rest positions towards the first and second operated positions, respectively, the clicking mechanism being directly pivotally connected to the base member about a first pivot axis,
the first part pivoting about the first pivot axis as each of the first and second operating members moves from the first and second rest positions towards the first and second operated positions, respectively, and the first part pivoting about a second pivot axis, which is offset from the first pivot axis, as each of the first and second operating members moves from the first and second operated positions towards the first and second rest positions, respectively.

9. The bicycle operating device according to claim 8, wherein
the clicking mechanism further includes a second part pivotally mounted to the base member about the first pivot axis, and the first part is pivotally mounted to the second part about the second pivot axis.

10. The bicycle operating device according to claim 9, wherein
the first part remains stationary with respect to the second part as the first part and the second part pivot together about the first pivot axis as each of the first and second operating members moves from the first and second rest positions towards the first and second operated positions, respectively, and
the first part pivots with respect to the second part about the second pivot axis as each of the first and second operating members moves from the first and second operated positions towards the first and second rest positions, respectively.

11. The bicycle operating device according to claim 10, wherein
the first operating member includes at least one projection that contacts the first part and pivots the first part about the first pivot axis as each of the first and second operating members moves from the first and second rest positions towards the first and second operated positions, respectively, and contacts the first part and pivots the first part about the second pivot axis as each of the first and second operating members moves from the first and second operated positions towards the first and second rest positions, respectively.

12. The bicycle operating device according to claim 8, wherein
the first operating member includes a first projection and a second projection that contact the first part as each of the first and second operating members moves from the first and second rest positions towards the first and second operated positions, respectively, the first projection having a first height and the second projection having a second height, and the first and second heights of the first and second projections are different from each other.

13. The bicycle operating device according to claim 12, wherein
the first projection is closer to the first part than the second projection while the first operating member is at the first rest position, and the first height of the first projection is smaller than the second height of the second projection.

14. The bicycle operating device according to claim 1, further comprising
an electric control unit operated by movement of each of the first and second operating members moving from the first and second rest positions towards the first and second operated positions, respectively.

15. The bicycle operating device according to claim 1, further comprising
first and second sensors configured to detect movement of the first and second operating members from the first and second rest positions to the first and second operated positions, respectively.

16. A bicycle operating device comprising:
a base member configured to be attached to a bicycle;
a first operating member movably supported on the base member from a first rest position to a first operated position;
a second operating member movably supported on the base member from a second rest position to a second operated position; and
a clicking mechanism including a first part contacting at least one of the first operating member and the second operating member to produce a haptic feedback response as each of the first and second operating members moves from the first and second rest positions towards the first and second operated positions, respectively, the first part being configured such that the first and second operating members are moveable back and forth between the first and second rest positions and the first and second operated positions, respectively,
the first part pivoting about a first pivot axis as each of the first and second operating members moves from the first and second rest positions towards the first and second operated positions, respectively, and the first part pivoting about a second pivot axis, which is offset from the first pivot axis, as each of the first and second operating members moves from the first and second operated positions towards the first and second rest positions, respectively
the clicking mechanism further including a second part pivotally mourned to the base member about the first pivot axis, and the first part being pivotally mounted to the second part about the second pivot axis,
the first part remaining stationary with respect to the second part as the first part and the second part pivot together about the first pivot axis as each of the first and second operating members moves from the first and second rest positions towards the first and second operated positions, respectively, and
the first part pivoting with respect to the second part about the second pivot axis as each of the first and second operating members moves from the first and second operated positions towards the first and second rest positions, respectively.

17. The bicycle operating device according to claim 16, wherein
the first operating member includes at least one projection that contacts the first part and pivots the first part about the first pivot axis as each of the first and second operating members moves from the first and second rest positions towards the first and second operated positions, respectively, and contacts the first part and pivots the first part about the second pivot axis as each of the first and second operating members moves from the first and second operated positions towards the first and second rest positions, respectively.

* * * * *